US011385891B1

(12) United States Patent
DeLuca et al.

(10) Patent No.: US 11,385,891 B1
(45) Date of Patent: Jul. 12, 2022

(54) DEEP TAGGED SOURCE CODE ISSUE MANAGEMENT

(71) Applicant: International Business Machines Corporation, Armonk, NY (US)

(72) Inventors: Lisa Seacat DeLuca, Bozeman, MT (US); Schuyler Bruce Matthews, Cary, NC (US); Sarika Budhiraja, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/227,433

(22) Filed: Apr. 12, 2021

(51) Int. Cl.
 *G06F 8/71* (2018.01)
 *G06F 8/36* (2018.01)
 *G06N 20/00* (2019.01)

(52) U.S. Cl.
 CPC ............... *G06F 8/71* (2013.01); *G06F 8/36* (2013.01); *G06N 20/00* (2019.01)

(58) Field of Classification Search
 None
 See application file for complete search history.

(56) References Cited

U.S. PATENT DOCUMENTS

| 8,504,361 | B2 | 8/2013 | Collobert |
| 10,065,120 | B2 | 9/2018 | Sharma |
| 10,499,010 | B2 * | 12/2019 | Mercredi ............... G06Q 30/06 |
| 10,701,434 | B1 * | 6/2020 | Jindal ............ H04N 21/440245 |
| 10,714,144 | B2 | 7/2020 | Delaney |
| 10,755,591 | B2 | 8/2020 | Correia Gracio |
| 10,783,375 | B2 | 9/2020 | Sridhar |
| 10,847,186 | B1 | 11/2020 | Krishnamurthy |
| 10,880,358 | B2 | 12/2020 | Ciabarra, Jr. |
| 2019/0087503 | A1 | 3/2019 | Wang |
| 2020/0219540 | A1 * | 7/2020 | Kulas ..................... H04N 21/84 |
| 2020/0304868 | A1 | 9/2020 | Ganjam |
| 2020/0413113 | A1 * | 12/2020 | Tofighbakhsh ...... G06K 9/6217 |

OTHER PUBLICATIONS

Shinyama, "CodeCAM: Capturing Programmer's Reaction during Coding Session", 2018, IEEE (Year: 2018).*
Bojko et al., "Synchronizing Video Playback Information Within a Distributed Framework", MediaSync 2013, 4 pages, ISBN/EAN—978-90-5986-439-9.
Fan et al., "VisTA: Integrating Machine Intelligence With Visualization to Support the Investigation of Think-Aloud Sessions", Downloaded Feb. 25, 2021, 10 pages.

(Continued)

*Primary Examiner* — Hossain M Morshed
(74) *Attorney, Agent, or Firm* — Randy E. Tejeda

(57) ABSTRACT

One or more computer processors associate a source code repository with a video session, wherein the source code repository contains one or more source code issues. The one or more computer processors identify one or more source code issues within the video session. The one or more computer processors create a plurality of video session segments based on the one or more identified source code issues within the video session and the associated source code repository. The one or more computer processors tag the created plurality of video session segments with corresponding source code issue information.

20 Claims, 4 Drawing Sheets

(56) References Cited

OTHER PUBLICATIONS

Fraser et al., "RePlay : Contextually Presenting Learning Videos Across Software Applications", CHI 2019 Paper, 13 pages, <https://doi.org/10.1145/3290605.3300527>.

Liu et al., "Graph Neural Network for Tag Ranking in Tag-Enhanced Video Recommendation", CIKM '20, Oct. 19-23, 2020, 8 pages, <https://doi.org/10.1145/3340531.3416021>.

Shum et al., "Memetic: From Meeting Memory to Virtual Ethnography & Distributed Video Analysis", ResearchGate, Uploaded Jun. 5, 2014, 12 pages, <https://www.researchgate.net/publication46765623>.

* cited by examiner

DEEP TAGGED SOURCE CODE ISSUE MANAGEMENT

BACKGROUND

The present invention relates generally to the field of code development, and more particularly to code development web conferencing.

A source code issue tracking system, bug tracking system, or defect tracking system is a software application that keeps track of reported software issues and bugs in software development projects. Many source code issue tracking systems, such as those used by most open-source software projects, allow end-users to enter source code issues or bug reports directly. Typically, source code issue tracking systems are integrated with other project management software, such as a source code repository.

SUMMARY

Embodiments of the present invention disclose a computer-implemented method, a computer program product, and a system. The computer-implemented method includes one or more computer processors associating a source code repository with a video session, wherein the source code repository contains one or more source code issues. The one or more computer processors identify one or more source code issues within the video session. The one or more computer processors create a plurality of video session segments based on the one or more identified source code issues within the video session and the associated source code repository. The one or more computer processors tag the created plurality of video session segments with corresponding source code issue information.

DETAILED DESCRIPTION

It is common with modern development practices (i.e., agile) to have daily video conferences (i.e., video sessions) with contributors, developers, and managers; in addition to weekly playback sessions (e.g., sprint demos) where video conferences are reviewed and implemented in subsequent workflows. Here, a video session or conference has at least audio, video, and/or textual communication or discussion with one or more participants. Often times conflicts (e.g., time zone differences, etc.) in schedules arise for contributors and developers, making it difficult or impossible for said individuals to attend all video sessions. Although current solutions provide the ability for these video sessions to be recorded, said solutions lack an automated method to identify development issues (i.e., source code issues) being discussed in video session playbacks and allow those who did not attend the video session to quickly navigate to a specific issue without traversing the entire video session. Further, current solutions lack the ability to dynamically update previously tagged video sessions based on changes to one or more source code repositories, such as a new branch, source code issue remediation, new source code issues, etc.

Embodiments of the present invention improve video session recordation and playback by automatically deep tagging, hereinafter tagging, excerpts or segments of a video session with related or associated source code issues or bugs. Some embodiments of the present invention recognize that automatic deep tagging of video sessions eliminates the need for a contributor or developer, that is only interested in a specific issue, to record, watch, and playback an entire video session. Embodiments of the present invention improve video session playback by updating tags based on changes to a corresponding source code repository. The present invention allows the system to save considerable computational resources by only transferring and presenting content related to a specific source code issue rather than transferring and presenting an entire recorded video session, allowing the system to utilize the saved computational resources for other tasks. In addition, the present invention allows a user to save considerable time and effort when scanning through a large, recorded video sessions for a specific issue. Implementation of embodiments of the invention may take a variety of forms, and exemplary implementation details are discussed subsequently with reference to the Figures.

The present invention will now be described in detail with reference to the Figures.

Figure 1:
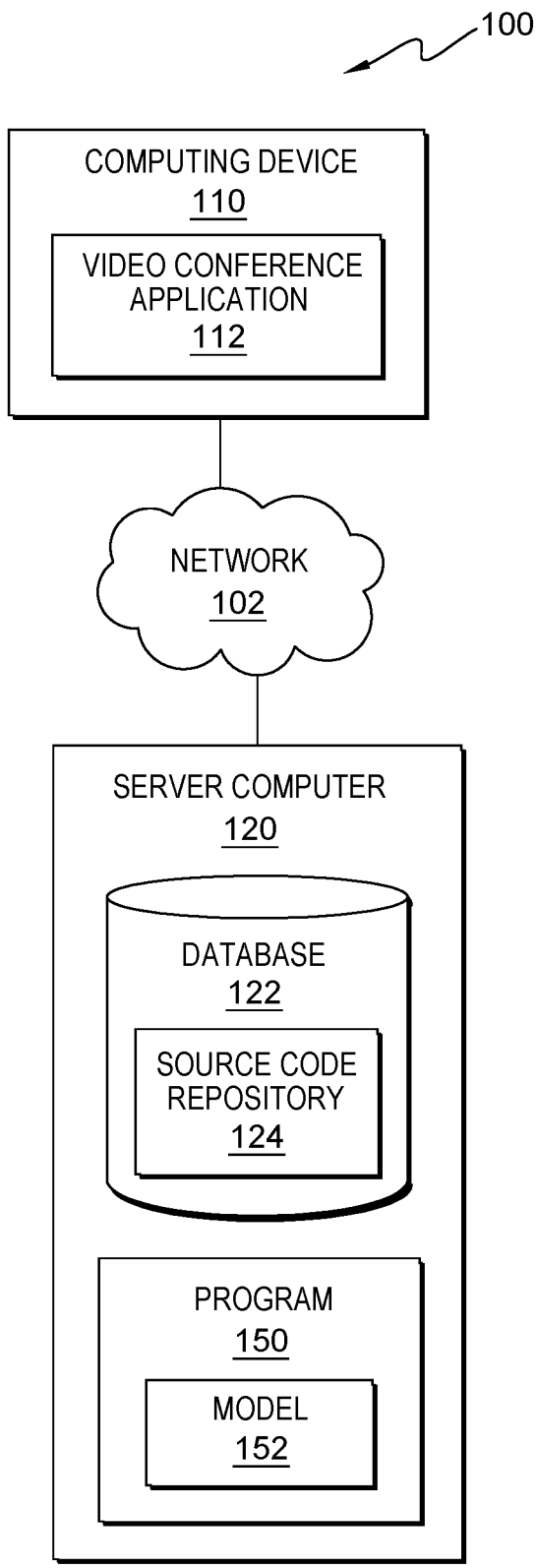
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes computing device 110 and server computer 120 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between computing device 110, server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Computing device 110 may be any electronic device or computing system capable of processing program instructions and receiving and sending data. In some embodiments, computing device 110 may be a laptop computer, a tablet computer, a netbook computer, a personal computer (PC), a desktop computer, a personal digital assistant (PDA), a smart phone, or any programmable electronic device capable of communicating with network 102. In other embodiments, computing device 110 may represent a server computing system utilizing multiple computers as a server system, such as in a cloud computing environment. In general, computing device 110 is representative of any electronic device or combination of electronic devices capable of executing machine readable program instructions as described in greater detail with regard to FIG. 4, in accordance with embodiments of the present invention. In the depicted embodiment, computing device 110 contains video conference application 112.

Video conference application 112 is a set of one or more programs designed to carry out the operations for a specific application to assist a user to coordinate, present, and record a video conference (i.e., session) with one or more collaborators, participants, and/or developers. In an embodiment, program 150 utilizes or directs video conference application 112 to displays tags or links to source code repository 124 or one or more source code issues contained in source code repository 124. In the depicted embodiment, video conference application 112 resides on computing device 110. In another embodiment, video conference application 112 may reside on server computer 120 or on another computing device (not shown) connected over network 102.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with computing device 110 and other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes database 122 and program 150. In other embodiments, server computer 120 may contain other applications, databases, programs, etc. which have not been depicted in computational environment 100. Server computer 120 may include internal and external hardware components, as depicted and described in further detail with respect to FIG. 4.

Database 122 is a repository for data used by program 150. In the depicted embodiment, database 122 resides on server computer 120. In another embodiment, database 122 may reside elsewhere (e.g., computing device 110) within computational environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. In an embodiment, database 122 stores data used by program 150, such as historical deep tagged recorded video sessions and associated source code repositories. In the depicted embodiment, database 122 contains source code repository 124.

Source code repository 124 is a file archive and web hosting facility for source code of software, documentation, web pages, and other works, accessible either publicly or privately. Source code repository 124 used by open-source software projects and other multi-developer projects to maintain revision and version history, or version control. Source code repository 124 provides a bug/issue tracking system, and offer release management, mailing lists, and wiki-based project documentation. In an embodiment, source code repository 124 contains a plurality of source code issues or bugs.

Program 150 is a program for dynamically tagging recorded video sessions with source code issues. In various embodiments, program 150 may implement the following steps: associate a source code repository with a video session, wherein the source code repository contains one or more source code issues; identify one or more source code issues within the video session; create a plurality of video session segments based on the one or more identified source code issues within the video session and the associated source code repository; and tag the created plurality of video session segments with corresponding source code issue information. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on computing device 110 or any other computing device (not depicted) within computational environment 100. In the depicted embodiment, program 150 includes model 152. Program 150 is depicted and described in further detail with respect to FIG. 2.

Model 152 is representative of a model utilizing deep learning techniques to train, calculate weights, ingest inputs, and output a plurality of solution vectors. In this embodiment, inputs include video sessions, video session excepts or segments, audio extracted from a video session or segment, text (e.g., conversational text from video session participants, text within video content, etc.) extracted from a video session or segment, and video or images extracted from a video session or segment. In a further embodiment, solutions vectors include related source code repositories and issues associated with probabilistic values. In an embodiment, model 152 or any machine learning model is applied to identify the one or more source code issues within the video session and associate the identified one or more source code issues with the one or more source issues contained in the source code repository. In an embodiment, model 152 is comprised of any combination of deep learning model, technique, and algorithm (e.g., decision trees, Naive Bayes classification, support vector machines for classification problems, random forest for classification and regression, linear regression, least squares regression, logistic regression). In an embodiment, model 152 utilizes transferrable neural networks algorithms and models (e.g., long short-term memory (LSTM), deep stacking network (DSN), deep belief network (DBN), convolutional neural networks (CNN), compound hierarchical deep models, etc.) that can be trained with supervised or unsupervised methods. In the depicted embodiment, model 152 is a recurrent neural network (RNN) trained utilizing supervised training methods. The training of model 152 is depicted and described in further detail with respect to FIG. 2.

The present invention may contain various accessible data sources, such as database 122 and source code repository 124, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
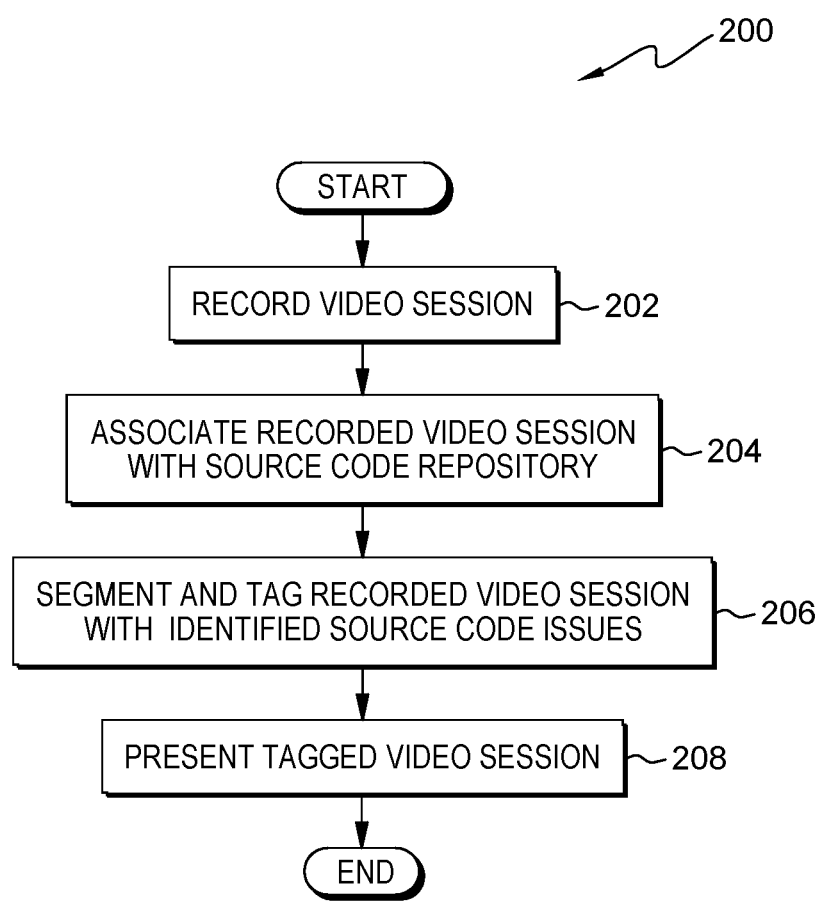
FIG. 2 is a flowchart depicting operational steps of a program, on a server computer within the computational environment of FIG. 1, for dynamically tagging recorded video sessions with source code issues, in accordance with an embodiment of the present invention.

FIG. 2 depicts flowchart 200 illustrating operational steps of program 150 for dynamically tagging recorded video sessions with source code issues, in accordance with an embodiment of the present invention.

Program 150 records video session (step 202). In an embodiment, program 150 initiates responsive to a detected video session. For example, program 150 detects the start of a scheduled web conference between a plurality of developers. In another embodiment, program 150 records video and audio associated with an ongoing video session. In this embodiment, program 150 captures and maintains a video, audio, and textual chat stream associated with the ongoing video session. In another embodiment, program 150 initiates responsive to a fed recorded video session. In these embodiments, program 150 maintains a list of all participants in the recorded video session, each with associated participant information such as contributor status, contributor role, related projects, and associated source code repositories.

Program 150 associates recorded video session with source code repository (step 204). Program 150 associates the segmented recorded video session, as described in step 202, with one or more source code repositories related to the recorded video session. In an example, the video session is a web conference with an objective of discussing a previously identified and tracked source code issue. In an embodiment, program 150 identifies one or more source code repositories related to the recorded video session by comparing the list of all participants in the recorded video session with a list of contributors associated with one or more source code repositories. For example, responsive to program 150 determining that each of the participants in the recorded video session are also contributor associated with a source code repository, program 150 associates the recorded video sessions with the source code repository. In another embodiment, a user, contributor, and/or participant provides the related source code repository.

Program 150 segments and tags the recorded video session with identified source code issues (step 206). In an embodiment, as program 150 records the video session, program 150, concurrently, segments the video session, where each segment contains a separate identified source code issue (i.e., topic). In this embodiment, program 150 continuously identifies topics and source code issues as the video session progresses. Here, program 150 creates a video session segment by creating indexes within the recorded video session that mark the start of a source code issue discussion and the end of the discussion. In this embodiment, program 150 utilizes natural language processing (NLP) to identify source code issue discussion and match source code issue discussion in the video session to a source code issue in an associated source code repository. In this embodiment, program 150 utilizes NLP to identify a plurality of topics (e.g., source code issues, source code bugs, source code repository information, etc.) identified in the video, audio, and/or text contained in the recorded video session. For example, program 150 parses text extracted from a chat or audio conversation between developers watching the video session NLP techniques, such as syntactic analysis to identify parts of speech and syntactic relations between various portions of the extracted text. In this embodiment, extracted audio is converted into a textual format. In a further embodiment, program 150 utilizes part-of-speech tagging to identify the particular part of speech of one or more words in text based on its relationship with adjacent and related words. In an embodiment, program 150 utilizes the aforementioned techniques to determine an associated topic for content contained in a video session segment.

In another embodiment, program 150 utilizes video frame image analysis to identify discussed source code issues and segment the video session based on the identified source code issue. For example, program 150 utilizes object tracking to track an object (e.g., code segment, function, class, file, etc.) given its position in a frame extracted from a video session. In this example, program 150 utilizes a trained CNN (e.g., model 152) to detect and identify objects within the video session. Responsive to an identification of an object (i.e., item related to a source code issue (e.g., section of code, source code issue reference number, source code issue title, etc.)), program 150 associates (e.g., provides a probability) the identified object with a source code issue. In these embodiments, program 150 utilizes object recognition and NLP to segment the video session into a plurality of segments or clips that each discuss a separate source code issue. In a further embodiment, each segment is associated with a source code repository and one or more source code issues contained in the source code repository.

Responsive to an identified source code issue for one or more video session segments, program 150 tags, links, or associates the one or more video session segments with source code issue information that includes source code issue numbers, source code repository uniform resource locators (URLs), source code issue priority, source code issue assignees, source code issue tags, source code issue description, source code issue title, source code issue status, and/or related source code projects or repositories. For example, program 150 tags a created video session segment with a URL to the source code issue hosted in an associated source code repository. In an embodiment, program 150 posts or inserts links to one or more tagged video session segments into a source code issue tracker associated with the source code repository allowing users to navigate to segments associated with a source code issue within the source code issue tracker. In an embodiment, program 150 deep tags the identified source code issue such that program 150 continues to update said deep tag as development continues.

In this embodiment, program 150 dynamically updates previously tagged video sessions based on changes to one or more source code repositories, such as a new branch, source code issue remediation, new source code issues, etc. For example, a deep tag includes a linked list of prior source code issues and subsequent source code issues related to the identified and deep tag source code issue segment.

Figure 3:
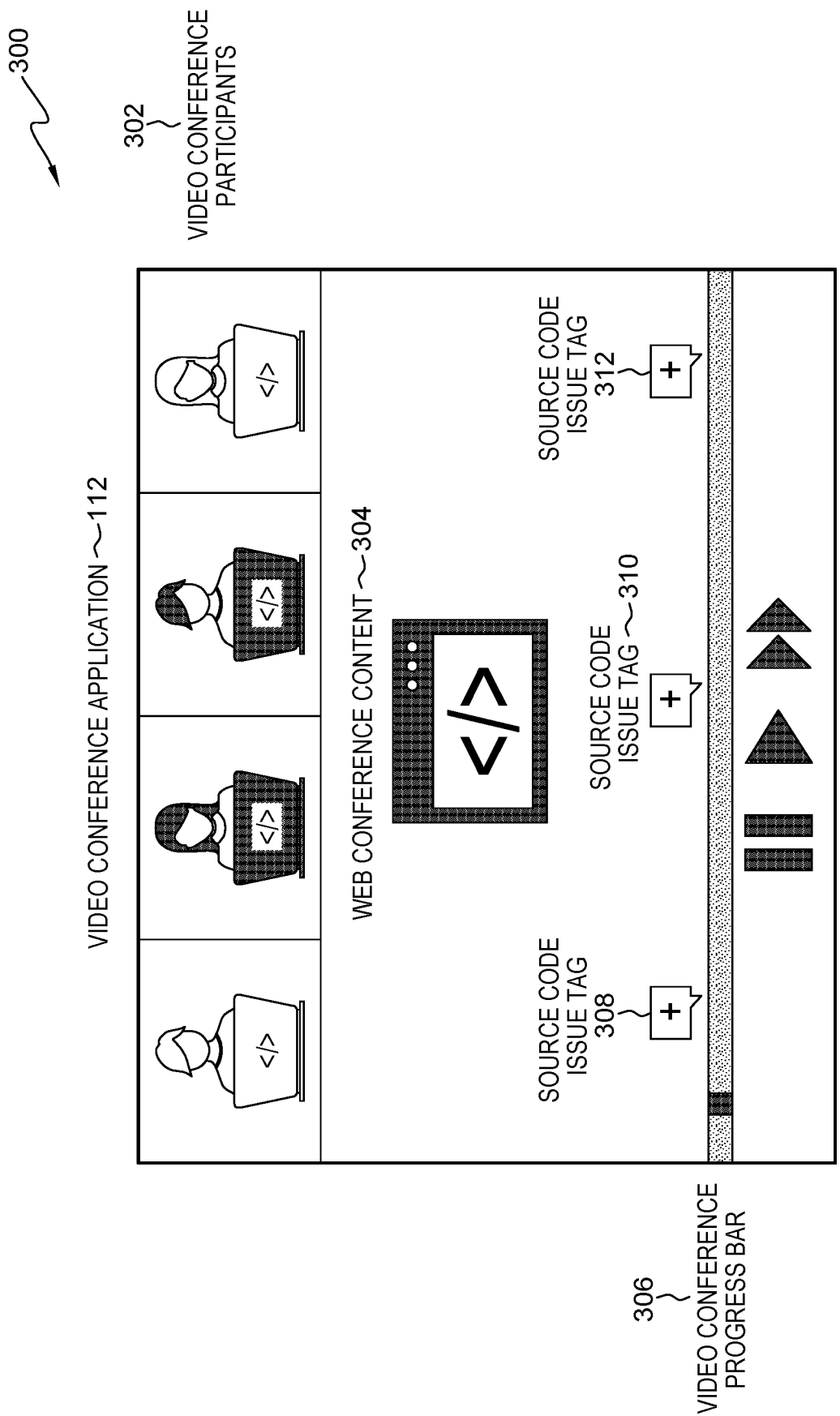
FIG. 3 is an exemplary illustration of operational steps of the program within the computational environment of FIG. 1, in accordance with an embodiment of the present invention.

Program 150 presents the tagged video session (step 208). Responsive, to a user requesting playback of the recorded video session, program 150 creates a graphical representation of a source code issue tag embedded within the playback of the recorded video session. For example, program 150 superimposes the graphical representation of the source code issue on the progress bar of video conference application 112 indicating an identified source code issue and the boundaries of a video session segment. FIG. 3 further depicts this example. In an embodiment, program 150 presents only video session segments related to a specific source code repository or source code issue. For example, responsive to a user providing a source code issue title, program 150 removes all video session segments unrelated to the source code issue associated with the source code issue title and presents the remaining segments to the user. In an embodiment, program 150 presents only video session segments that a user is allowed to view dictated by a security role or profile associated with the user, project permissions, and user permissions. In another embodiment, program 150 adjusts the presentation of a tagged video segment based on one or more labels associated with associated source code issues. For example, a tagged video segment is associated with a source code issue labelled with a priority label, responsively, program 150 adds a red filter to the presented tag representing the level of issue priority.

In an embodiment, responsive to a user clicking or selecting a presented source issue tag, program 150 opens an integrated development environment (IDE), on a computing device associated with a user, and directs the IDE to navigate to a portion of code associated with the source code issue contained in the clicked source code issue tag. In this embodiment, as the user traverses the code displayed in the IDE, program 150 simultaneously, displays video session segments associated with the displayed code. For example, program 150 presents the video session segment associated with the presented code in a pop out video player overlayed on top of the IDE. In another embodiment, a user utilizes program 150 to search an archive of historical video sessions (e.g., database 122) for specific segments. For example, program 150 returns and presents a set of all video session segments associated with a source code issue, source code repository branch, or source code issue category (e.g., urgent, enhancement, low priority, etc.). In an embodiment, program 150 continues to track and update tagged source code issues responsive to changes in a corresponding source code repository and source code issue tracker. For example, as a user watches an older playback of a tagged video session segment, program 150 adds or updates the tagged video session segment with a related, subsequent source code issue (e.g., another source code issue that stems from a similar segment of code or function). In another embodiment, program 150 removes tagged video session segments associated with resolved source code issues.

FIG. 3 depicts example 300, in accordance with an illustrative embodiment of the present invention. Example 300 illustrates a playback of a tagged recorded video conference (i.e., video session) on video conference application 112. Program 150 directs video conference application 112 to present tagged segments associated with web conference content 304 on video conference progress bar 306, where web conference content 304 is a visual, auditory, and textual discussion with video conference participants 302 of one or more source code issues. Program 150 associates each segment with a source code issue tag (e.g., source code issue tag 308, source code issue tag 310, and source code issue tag 312) displayed or embedded within video conference progress bar 306. The user or viewer of the playback is able to select a source code issue tag and directly navigate to the discussion of said issue. Here, program 150 opens the selected source code issue on a user interface associated with a source code issue tracker on the source code repository. Program 150 presents the identified source code issue information, such as source code issue title, source code issue contributor comments, source code issue pipelines, source code issue overview, source code issue assignees, links to related tagged video session segments, and source code issue labels.

Figure 4:
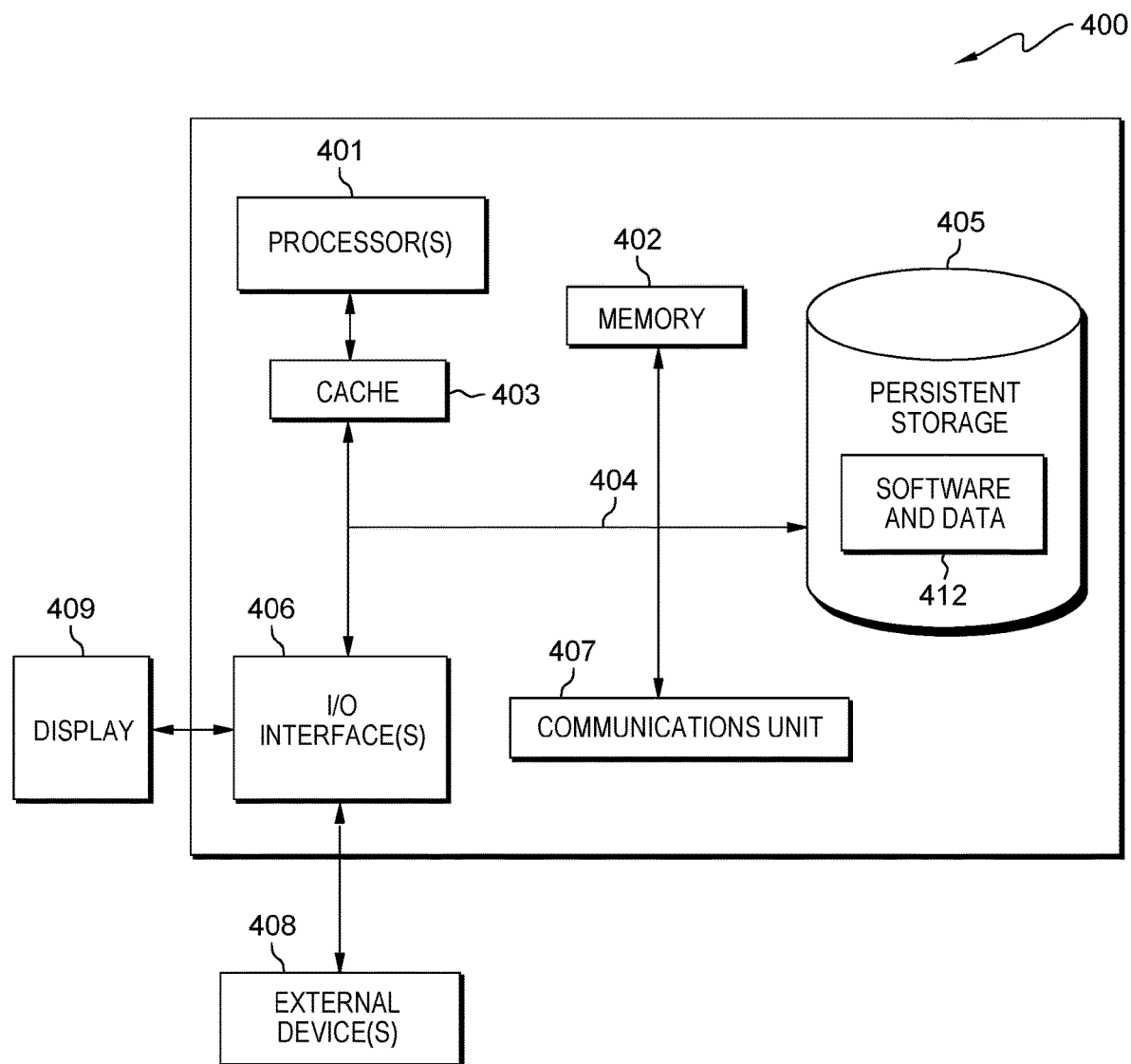
FIG. 4 is a block diagram of components of the server computer, in accordance with an embodiment of the present invention.

FIG. 4 depicts block diagram 400 illustrating components of computing device 110 and server computer 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 110 and server computer 120 each include communications fabric 404, which provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications, and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of computer processor(s) 401 by holding recently accessed data, and data near accessed data, from memory 402.

Program 150 may be stored in persistent storage 405 and in memory 402 for execution by one or more of the respective computer processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 can be stored in persistent storage 405 for access and/or execution by one or more of the respective processors 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program 150 may be downloaded to persistent storage 405 through communications unit 407.

I/O interface(s) 406 allows for input and output of data with other devices that may be connected to server computer 120. For example, I/O interface(s) 406 may provide a connection to external device(s) 408, such as a keyboard, a keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 405 via I/O interface(s) 406. I/O interface(s) 406 also connect to a display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q#, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    associating, by one or more computer processors, a source code repository with a video session, wherein the source code repository contains one or more source code issues;
    identifying, by one or more computer processors, one or more source code issues within the video session;
    creating, by one or more computer processors, a plurality of video session segments based on the one or more identified source code issues within the video session and the associated source code repository; and
    tagging, by one or more computer processors, the created plurality of video session segments with corresponding source code issue information.

2. The computer-implemented method of claim 1, further comprising:
    generating, by one or more computer processors, a graphical representation of tagged source code issue information for each video session segment in the plurality of video session segments.

3. The computer-implemented method of claim 2,
    presenting, by one or more computer processors, the generated graphical representation of tagged source code issue information in a playback of the video session.

4. The computer-implemented method of claim 1, wherein identifying the one or more source code issues within the video session, comprises:
    applying, by one or more computer processors, a machine learning model to identify the one or more source code issues within the video session and associate the identified one or more source code issues with the one or more source issues contained in the source code repository.

5. The computer-implemented method of claim 1, further comprising:
    updating, by one or more computer processors, at least one video session segment in the tagged plurality of video session segments based on subsequent changes to the associated source code issues contained the source code repository.

6. The computer-implemented method of claim 1, wherein the video session is a web conference with an objective of discussing a previously identified and tracked source code issue.

7. The computer-implemented method of claim 1, wherein the source code issue information includes source code issue numbers, source code repository uniform resource locators, source code issue priority, source code issue assignees, source code issue tags, source code issue description, source code issue title, source code issue status, and related source code projects or repositories.

8. A computer program product comprising:
    one or more computer readable storage media and program instructions stored on the one or more computer readable storage media, the stored program instructions comprising:
    program instructions to associate a source code repository with a video session, wherein the source code repository contains one or more source code issues;
    program instructions to identify one or more source code issues within the video session;
    program instructions to create a plurality of video session segments based on the one or more identified source code issues within the video session and the associated source code repository; and
    program instructions to tag the created plurality of video session segments with corresponding source code issue information.

9. The computer program product of claim 8, wherein the program instructions, stored on the one or more computer readable storage media, further comprise:
    program instructions to generate, a graphical representation of tagged source code issue information for each video session segment in the plurality of video session segments.

10. The computer program product of claim 9, wherein the program instructions, stored on the one or more computer readable storage media, further comprise:
    program instructions to present the generated graphical representation of tagged source code issue information in a playback of the video session.

11. The computer program product of claim 8, wherein the program instructions, to identify the one or more source code issues within the video session, comprise:
    program instructions to apply a machine learning model to identify the one or more source code issues within the video session and associate the identified one or more source code issues with the one or more source issues contained in the source code repository.

12. The computer program product of claim 8, wherein the program instructions, stored on the one or more computer readable storage media, further comprise:
    program instructions to update at least one video session segment in the tagged plurality of video session segments based on subsequent changes to the associated source code issues contained the source code repository.

13. The computer program product of claim 8, wherein the video session is a web conference with an objective of discussing a previously identified and tracked source code issue.

14. The computer program product of claim 8, wherein the source code issue information includes source code issue numbers, source code repository uniform resource locators, source code issue priority, source code issue assignees, source code issue tags, source code issue description, source code issue title, source code issue status, and related source code projects or repositories.

15. A computer system comprising:
    one or more computer processors;
    one or more computer readable storage media; and
    program instructions stored on the computer readable storage media for execution by at least one of the one or more processors, the stored program instructions comprising:
        program instructions to associate a source code repository with a video session, wherein the source code repository contains one or more source code issues;
        program instructions to identify one or more source code issues within the video session;
        program instructions to create a plurality of video session segments based on the one or more identified source code issues within the video session and the associated source code repository; and
        program instructions to tag the created plurality of video session segments with corresponding source code issue information.

16. The computer system of claim 15, wherein the program instructions, stored on the one or more computer readable storage media, further comprise:
    program instructions to generate, a graphical representation of tagged source code issue information for each video session segment in the plurality of video session segments.

17. The computer system of claim 16, wherein the program instructions, stored on the one or more computer readable storage media, further comprise:
    program instructions to present the generated graphical representation of tagged source code issue information in a playback of the video session.

18. The computer system of claim 15, wherein the program instructions, to identify the one or more source code issues within the video session, comprise:
    program instructions to apply a machine learning model to identify the one or more source code issues within the video session and associate the identified one or more source code issues with the one or more source issues contained in the source code repository.

19. The computer system of claim 15, wherein the program instructions, stored on the one or more computer readable storage media, further comprise:
    program instructions to update at least one video session segment in the tagged plurality of video session segments based on subsequent changes to the associated source code issues contained the source code repository.

20. The computer system of claim 15, wherein the video session is a web conference with an objective of discussing a previously identified and tracked source code issue.

\* \* \* \* \*